United States Patent [19]

Moskovich

[11] Patent Number: 4,971,428

[45] Date of Patent: Nov. 20, 1990

[54] CATADIOPTRIC ZOOM LENS

[75] Inventor: Jacob Moskovich, Cincinnati, Ohio

[73] Assignee: Lenzar Optics Corporation, Riviera Beach, Fla.

[21] Appl. No.: 329,284

[22] Filed: Mar. 27, 1989

[51] Int. Cl.⁵ ............................................. G02B 17/00
[52] U.S. Cl. .................................... 350/442; 350/446; 350/503
[58] Field of Search ............... 350/442, 443, 444, 446, 350/503, 504, 505

[56] References Cited

U.S. PATENT DOCUMENTS 3,152,214 10/1964 Korones et al. ...................... 350/503

Primary Examiner—Paul M. Dzierzynski
Attorney, Agent, or Firm—Robert H. Montgomery

[57] ABSTRACT

A catadioptric zoom lens comprising from the object end a first catadioptric group including a relay subgroup for forming an intermediate image, zoom relay, the zoom relay including a positive variator group and a negative power compensator group, the variator group comprising a first sub-unit of weak power contributing to correction of coma and a second sub-unit providing most of the positive power of the variator group.

8 Claims, 1 Drawing Sheet

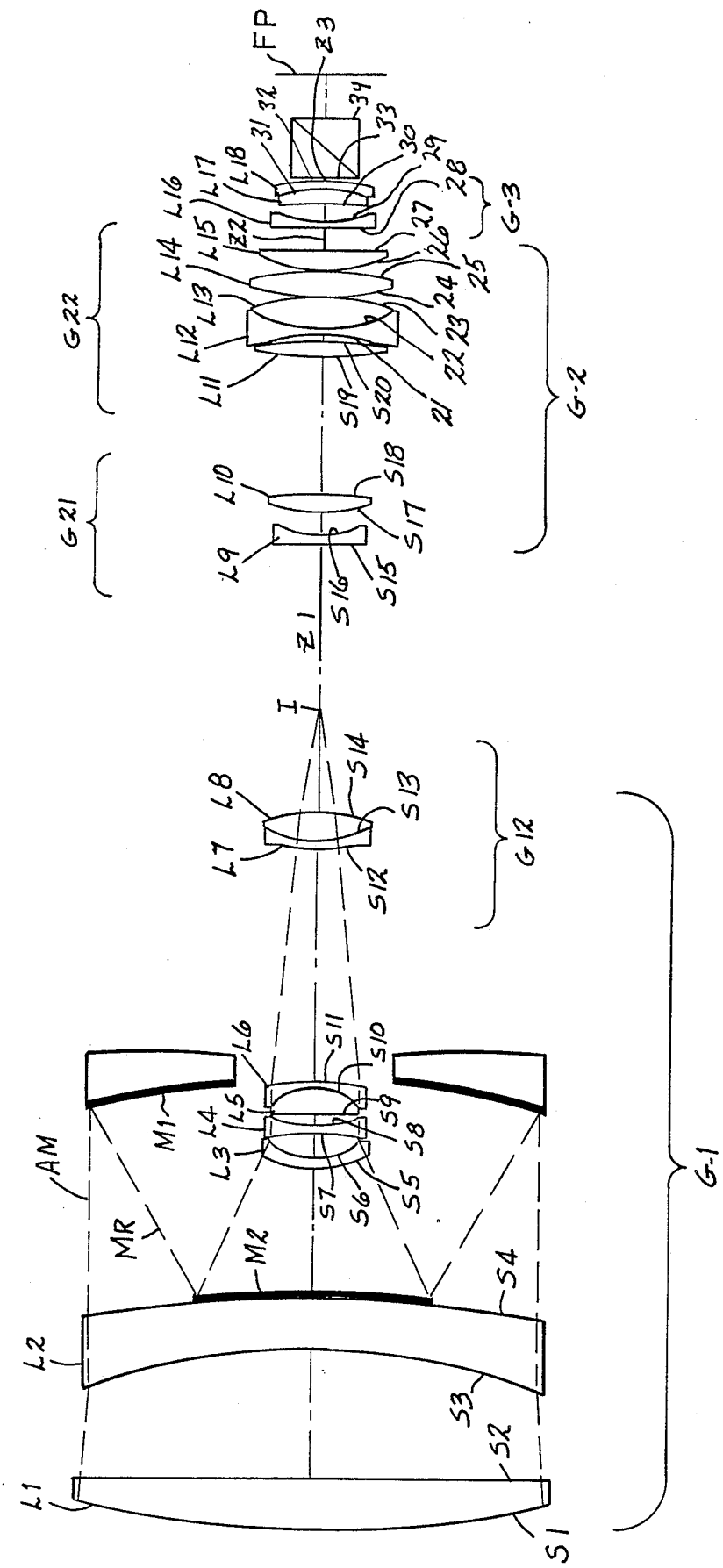

CATADIOPTRIC ZOOM LENS

FIELD OF THE INVENTION

This invention relates to zoom lenses and more particularly a catadioptric zoom lens.

BACKGROUND OF THE INVENTION

Catadioptric lenses, in general, permit a more compact size of lens for a given eguivalent focal length (EFL) and inheritantly provide better correction of chromatic aberration. This becomes very important when designing long focal length lenses. The disadvantage of having a central obscuration is often over looked in order to achieve a smaller and faster telephoto lens then is possible with a lens of refracting optics of comparable specifications.

An extreme case is an astronomical telescope having a focal length into meters. The chromatic aberrations, particularly secondary axial color of the refractive optics of this focal length would make such a telescope very limited in its ability to resolve minute details that are capable of being discerned with a reflective type device In addition, the cost of making such a refracting lens is also astronomical.

When it is desirable to have a long focal length zoom lens, the catadioptric lens can be used as a fixed front group and the zooming group may be placed behind it. If zooming groups are located before the real image is formed, then the power of each of these zooming groups must be quite strong to achieve a necessary change in magnification within a limited space. To obtain a 10 to 1 zooming ratio, would reguire particularly strong zooming groups to minimize necessary zooming travel of the variator and compensator and in turn would make an appropriate correction of aberrations more difficult to achieve.

The variator must work around a magnification of unity to achieve the shortest conjugate distance for the zoom relay. The speed of the zoom lens is determined by the fixed size pupil of the catadioptric portion of the front group of the lens, and the F number of the lens is, therefore, variable with zooming. Consequently, a zoom lens having a 10 to 1 zooming ratio while having a useful f/12 at the long end of the zoom range must also have a speed of f/1.2 at the shortest end of that range. The combination of the aperture and the field dependent aberrations like spherical and coma at the short end of the zoom range will to a large extent determine the complexity of relay components and the size of the zoom lens as a whole.

The present invention, provides a new and improved catadioptric zoom lens having a long equivalent focal length reaching into meters and a zoom ratio on the order of 10 to 1.

SUMMARY OF THE INVENTION

Briefly stated, the invention in one form thereof comprises from the object end a fixed catadioptric first group having a rear relay lens sub-group which creates an intermediate image, a positive variator, and a negative compensator which maybe followed by a viewing prism. The first catadioptric lens group is designed with a positive petval curvature which when combined with the zooming relay group of the lens, which naturally has a strong negative petzval curvature, provide a good correction of the field curvature, Correction of a astigmatism is also achieved. The dominant remaining aberrations left are spherical and coma. The positive variator group is divided into two subgroups separated by a large air space. The first subgroup has weak power and its main function is to provide a large positive contribution to correction of coma. The second sub group closest to the film plane, provides most of the power of the variator group. The main contributions to correction of spherical aberrations as well as other residual and chromatic aberrations, come from the second subgroup of the variator.

The combined aberrations of the variator group are balanced against the aberrations of a simple negative power compensating group to provide a zoom relay which when used behind the intermediate image formed by the catadioptric lens, provides a high optical performance level in a large zoom ratio catadioptric lens having an extremely long EFL.

An object of this invention is to provide a new and improved zoom lens which is compact and of long focal lengths and having a large zoom ratio.

A further object of this invention is to provide a new and improved zoom lens, which is extremely compact, considering its focal length range and zoom ratio.

BRIEF DESCRIPTION OF THE DRAWINGS

The single figure of the drawings shows schematically, in side elevation, a lens embodying the inventions in its shortest focal length position.

DETAILED DESCRIPTION OF PREFERRED EMBODIMENT

A lens embodying the invention as illustrated comprises a first catadioptric group G1 having a relay subgroup G12. Group G1 is followed by a variator or zooming relay group G2 which is comprised of a first subgroup G21 and a second subgroup G22. Group G2 is followed by a compensating group G3 and a stationery split prism P prior to the focal plane FP. The optical axis of the lens is indicated by the reference letter A. The purpose of the prism is to permit imaging on more than one device. For example, a video imaging device, and a camera.

The catadioptric first group G1 comprises a first element L1, a second element L2 both followed by an element designated as M1 and having a reflective mirror surface on the object side thereof. In the drawing, the axial marginal rays are shown reflecting from M1 back to a mirror M2 on the image side surface of element L2. The reflected rays MR from mirror M2 lead to a refractory sub group comprising lens elements L3, L4 L5 and L6 with elements L5 and L6 forming a cemented doublet.

The first group G1 further includes a relay subgroup G12 which creates an intermediate image designated as I as indicated by the marginal axial rays in the zoom space Z1 subgroup G12 comprises a cemented doublet L7 and L8 of overall biconvex shape.

Subgroup G21 of group G2 which comprises a negative meniscus L9 and a biconvex element L10 taken together are of weak optical power and provide a large positive contribution to the correction of coma.

The second sub group G22 of group G2 provides the majority of the power of the variator group G2 and provides the main contributions to correction of spherical aberration as well as chromatic, and residual aberrations.

The combined aberrations of the variator group G2 are balanced against the aberrations of a simple negative power compensator group G3. Groups G2 and G3 provide a zoom relay which when used behind the intermediate image formed by the subgroup G12 of the catadioptric group G1 provides high optical performance in a large zoom ratio catadioptric zoom lens.

It will be noted that with the zoom relay provided by groups G2 and G3, no objective lens or relay lens is required between the compensator and the focal plane FP.

A lens embodying the invention is described in the following Table I in which:

radii which are positive are struck from the right and radii which are negative are struck from the left, the index of refraction of each element is given under the heading "N". Dispersion of the elements is measured by their Abbe number are given under the heading "V" The zoom spacing is given under the heading ZOOM SPACING DATA together with the relative aperture at four different zoom positions. A lens embodying the invention as set forth in Table I is scaled for an image frame diagonal of sixteen millimeters.

TABLE I

| LENS | SURFACE | RADII (mm) | AXIAL DISTANCE BETWEEN SURFACES (mm) | $N_d$ | $V_d$ |
|------|---------|-----------|--------------------------------------|-------|-------|
| L1   | S1      | 452.914   |                                      |       |       |
|      |         |           | 20.000                               | 1.517 | 64.2  |
|      | S2      | Plano     |                                      |       |       |
|      |         |           | 53.581                               |       |       |
|      | S3      | −279.954  |                                      |       |       |
| L2   |         |           | 20.000                               | 1.517 | 64.2  |
|      | S4      | −655.928  |                                      |       |       |
|      |         |           | 94.923                               |       |       |
|      | M1      | −369.745  |                                      |       |       |
|      |         |           | −94.923                              |       |       |
|      | M2      | −655.928  |                                      |       |       |
|      |         |           | 55.246                               |       |       |
|      | S7      | 46.225    |                                      |       |       |
| L3   |         |           | 3.900                                | 1.785 | 25.7  |
|      | S8      | 28.183    |                                      |       |       |
|      |         |           | 11.186                               |       |       |
|      | S9      | −111.082  |                                      |       |       |
| L4   |         |           | 2.900                                | 1.487 | 70.4  |
|      | S10     | 49.354    |                                      |       |       |
|      |         |           | 4.626                                |       |       |
|      | S11     | 751.200   |                                      |       |       |
| L5   |         |           | 11.700                               | 1.717 | 29.5  |
|      | S12     | −25.492   |                                      |       |       |
| L6   |         |           | 2.000                                | 1.540 | 59.7  |
|      | S13     | −122.771  |                                      |       |       |
|      |         |           | 98.145                               |       |       |
|      | S14     | 138.551   |                                      |       |       |
| L7   |         |           | 2.500                                | 1.805 | 25.5  |
|      | S15     | 40.242    |                                      |       |       |
|      |         |           | .500                                 |       |       |
|      | S16     | 41.500    |                                      |       |       |
| L8   |         |           | 12.500                               | 1.658 | 57.3  |
|      | S17     | −61.089   |                                      |       |       |
|      |         |           | Z1                                   |       |       |
|      | S18     | −548.935  |                                      |       |       |
| L9   |         |           | 4.000                                | 1.567 | 42.8  |
|      | S19     | 45.141    |                                      |       |       |
|      |         |           | 9.230                                |       |       |
|      | S20     | 72.184    |                                      |       |       |
| L10  |         |           | 7.000                                | 1.834 | 37.3  |
|      | S21     | −245.662  |                                      |       |       |
|      |         |           | 58.746                               |       |       |
|      | S22     | 176.658   |                                      |       |       |
| L11  |         |           | 6.100                                | 1.743 | 49.2  |
|      | S23     | 222.217   |                                      |       |       |
|      |         |           | 2.600                                |       |       |
|      | S24     | −90.073   |                                      |       |       |
| L12  |         |           | 2.000                                | 1.755 | 27.5  |
|      | S25     | 56.701    |                                      |       |       |

TABLE I-continued

| LENS | SURFACE | RADII (mm) | AXIAL DISTANCE BETWEEN SURFACES (mm) | $N_d$ | $V_d$ |
|------|---------|-----------|--------------------------------------|-------|-------|
| L13  |         |           | 13.900                               | 1.589 | 61.3  |
|      | S26     | −98.998   |                                      |       |       |
|      |         |           | .200                                 |       |       |
|      | S27     | 118.203   |                                      |       |       |
| L14  |         |           | 10.100                               | 1.713 | 53.9  |
|      | S28     | −159.295  |                                      |       |       |
|      |         |           | .200                                 |       |       |
|      | S29     | 51.200    |                                      |       |       |
| L15  |         |           | 8.200                                | 1.713 | 53.9  |
|      | S30     | 379.351   |                                      |       |       |
|      |         |           | Z2                                   |       |       |
|      | S31     | −842.492  |                                      |       |       |
| L16  |         |           | 2.500                                | 1.773 | 49.6  |
|      | S32     | 59.240    |                                      |       |       |
|      |         |           | 7.529                                |       |       |
|      | S33     | −204.895  |                                      |       |       |
| L17  |         |           | 6.000                                | 1.673 | 32.2  |
|      | S34     | −50.681   |                                      |       |       |
| L18  |         |           | 2.500                                | 1.607 | 56.7  |
|      | S35     | −119.403  |                                      |       |       |
|      |         |           | Z3                                   |       |       |
|      | S36     | Plano     |                                      |       |       |
| L19  |         |           | 25.000                               | 1.805 | 25.5  |
|      | S37     | Plano     |                                      |       |       |
| FP   |         |           | 20.109                               |       |       |

| ZOOM SPACING DATA | | | | |
|---|---|---|---|---|
| EFL (mm) | $Z_1$ (mm) | $Z_2$ (mm) | $Z_3$ (mm) | F/No. |
| 261.6  | 111.86 | 10.55  | 1.00  | 1.32  |
| 700.00 | 53.85  | 3.00   | 66.57 | 3.53  |
| 1125.0 | 31.22  | 13.55  | 78.64 | 5.67  |
| 2502.0 | 1.89   | 107.93 | 13.59 | 12.65 |

| GROUP FOCAL LENGTHS | |
|---|---|
| GROUP | EFL |
| G1 | 515.7 mm |
| G2 | 40.8 mm |
| G3 | −99.7 mm |

The intermediate image I is formed approximately 21.2 mm behind relay subgroup G12. Only at the longest EFL's will the first subgroup G21 of group G2 move through this intermediate image I. Subgroup G12 may be moved for focusing if desired.

The predominant change in magnification is due to variator group G2 which has a magnification ratio $$M_L/M_S = 8.67$$

where $M_L$ is the magnification at the longest EFL and $M_S$ is the magnification at the shortest EFL. Magnification is used in the sense of the ratio of the image height to the object height.

Various parameters of the lens units may be expressed as a ratio to the geometric mean of the powers of the lens ($K_M$). $K_M = \sqrt{K_S K_L}$ where $K_S$ is the power of the lens at its shortest focal length and $K_L$ is the power of the lens at its longest EFL.

A lens embodying the invention has the following parameters $$40.0 > K_2/K_M > 16.0$$

where $K_2$ is the power of lens group G2, and $$20.0 > K_3/K_M > 6.0$$

where $K_3$ is the power of lens group G3. Also the second group G2 is much stronger in absolute power than the third group as shown by the following relationship $$3.5 > K_2/K_3 > 1.4$$

The spacing between subgroups G21 and G22 of group G2 is $$1.7 > T/F_2 > 0.6$$

where T is the spacing and $F_2$ is the equivalent focal length of the second group G2. This spacing of the weak subgroup aids in providing the aberration correction previously discussed.

It may be seen that a lens embodying the invention has a long EFL exceeding two and a half meters. It has a front vertex distance (FVD) of only six hundred millimeters. This exemplifies the compactness of the lens for this focal length range. The long EFL is over four times the front vertex distance.

It may thus be seen that the objects of the invention set forth, as well as those made apparent from the foregoing description, are efficiently attained. While a preferred embodiment of the invention has been set forth for purposes of disclosure, modifications to the disclosed embodiment of the invention, as well as other embodiments thereof, may occur to those skilled in the art. Accordingly, the appended claims are intended to cover all embodiments of the invention and modifications to the disclosed embodiments which do not depart from the spirit and scope of the invention.

What is claimed is:

1. A catadioptric zoom lens comprising from the object end a first catadioptric group including a relay subgroup for forming an intermediate image, a zoom relay, said zoom relay including a second positive variator group and a third negative power compensator group, said second and third groups being axially moveable to vary the equivalent focal length of said lens said variator group comprising a first subgroup of weak power contributing to correction of coma and a second subgroup providing most of the positive power of said second variator group, said second group being of greater optical power than the absolute optical power of said third group.

2. The lens of claim 1 where the spacing between said first and second sub-groups of said second variator group is between 1.7 $F_0$ and 0.6 $F_0$ and $F_o$ is the equivalent focal length of said second variator group.

3. The lens of claim 1 where $$3.5 > K_2/K_3 > 1.4$$

where $K_2$ is the power of said second group and $K_3$ is the power of said third group.

4. The lens of claim 1 where said lens consists of said three groups.

5. The lens of claim 1 where said second group has an optical power which is greater than twice the absolute power of said third group.

6. A catadioptric zoom lens comprising from the object end of a first catadioptric group, and a zoom relay, said zoom relay comprising a second positive variator group and a third negative compensating group, said variator group comprising a first subgroup of weak power and a second positive subgroup providing most of the positive power of said variator group, said first and second subgroups being separate by an airspace between 1.7 $F_o$ and 0.6 $F_o$ where $F_o$ is the equivalent focal length of said second group.

7. The lens of claim 6 where said second group has an optical power which is greater than twice the absolute power of said third group.

8. The lens of claim 6 where $$3.5 > K_2/K_3 > 1.4$$

where $K_2$ is the power of said second group and $K_3$ is the power of said third group.